(12) United States Patent
Plewa et al.

(10) Patent No.: US 7,785,177 B2
(45) Date of Patent: Aug. 31, 2010

(54) DEVICE FOR THE AUTOMATED MONITORING OF PACKAGING MACHINES FOR THE PRODUCTION OF SAUSAGES

(75) Inventors: Manfred Plewa, Verden (DE); Gunnar Jäckel, Asendorf (DE)

(73) Assignee: Tipper Tie technopack GmbH (DE)

( * ) Notice: Subject to any disclaimer, the term of this patent is extended or adjusted under 35 U.S.C. 154(b) by 587 days.

(21) Appl. No.: 11/596,684

(22) PCT Filed: Dec. 10, 2004

(86) PCT No.: PCT/EP2004/014107
§ 371 (c)(1),
(2), (4) Date: Nov. 21, 2007

(87) PCT Pub. No.: WO2005/115154
PCT Pub. Date: Dec. 8, 2005

(65) Prior Publication Data
US 2008/0207103 A1 Aug. 28, 2008

(30) Foreign Application Priority Data
May 12, 2004 (DE) .................. 20 2004 007 789

(51) Int. Cl.
*A22C 11/00* (2006.01)
(52) U.S. Cl. .................................................... 452/30
(58) Field of Classification Search ............ 452/21–26, 452/30–37, 46–48, 51
See application file for complete search history.

(56) References Cited
U.S. PATENT DOCUMENTS

| | | | | |
|---|---|---|---|---|
| 4,366,600 A | * | 1/1983 | Townsend et al. | 452/31 |
| 4,565,054 A | * | 1/1986 | Piereder | 53/517 |
| 4,612,684 A | * | 9/1986 | Kollross | 452/35 |
| 4,625,362 A | * | 12/1986 | Kollross et al. | 452/22 |
| 4,980,949 A | | 1/1991 | Stanley et al. | |
| 4,984,073 A | | 1/1991 | Lemelson et al. | |
| 5,668,634 A | * | 9/1997 | Newman | 356/445 |
| 5,743,792 A | * | 4/1998 | Hanten et al. | 452/37 |
| 6,245,369 B1 | * | 6/2001 | Kobussen et al. | 426/231 |
| 6,524,178 B1 | * | 2/2003 | Fassler et al. | 452/37 |
| 6,558,241 B2 | * | 5/2003 | Hergott et al. | 452/31 |
| 6,932,688 B2 | * | 8/2005 | Stanley et al. | 452/48 |
| 6,996,948 B2 | | 2/2006 | Koke et al. | |
| 7,258,604 B2 | * | 8/2007 | Reutter | 452/30 |
| 7,479,057 B2 | * | 1/2009 | Waldstaedt et al. | 452/32 |
| 7,553,222 B2 | * | 6/2009 | Jackel | 452/38 |

FOREIGN PATENT DOCUMENTS

| | | |
|---|---|---|
| DE | 3608983 | 10/1987 |
| DE | 19953695 | 11/1999 |
| EP | 0755188 | 3/1995 |
| WO | WO00/03603 | 1/2000 |

* cited by examiner

*Primary Examiner*—Thomas Price
(74) *Attorney, Agent, or Firm*—Casimir Jones S.C.

(57) ABSTRACT

The subject matter of the invention is a device and a method for the automated monitoring of packaging machines for the production of sausages, the packaging machines having a filling machine (F), a filling pipe (1), a skin brake (2) and a sealing machine (V). The device according to the invention is characterized in that it has a camera (6, 6', 6") which supplies an electric image signal, an evaluation unit (7) for the image signal and a switching-off unit (8), which is activated by the evaluation unit, for the filling machine (F). The invention permits automated monitoring of malfunctions of packaging machines for the production of sausages.

4 Claims, 2 Drawing Sheets

DEVICE FOR THE AUTOMATED MONITORING OF PACKAGING MACHINES FOR THE PRODUCTION OF SAUSAGES

The invention relates to a device for the monitoring of automated packaging machines for the production of sausages. These machines serve to fill sausage meat into an artificial or natural skin and to seal the respective ends of the skin.

Packaging machines for the production of sausages within the meaning of the invention comprise the following components:
- a filling machine which presses the sausage meat into the input end of a filling pipe,
- a skin brake which is arranged at the output end of the filling pipe, and
- a sealing machine for sealing the skin.

The packaging with the aid of machines of this type usually takes place as follows:

First of all, an empty skin which is closed on one side and has a large length is pulled onto the filling pipe from the output end thereof. It is then generally gathered to form a bead.

The skin brake is then brought into its working position. The skin brake is a device which puts up a frictional force to the removal of the skin from the filling pipe. Without a frictional force of this type, the skin would be only nonuniformly removed from the filling pipe, for which reason uniform packaging would be scarcely possible. The skin brake generally comprises one or more rings made of elastic material which surround the filling pipe. When a skin is situated on the filling pipe, the latter is pressed by the elastic material onto the surface of the filling pipe, thus producing the desired frictional force when removing it. The working position of the skin brake is a location at the output end of the filling pipe (cf. DE 199 53 695).

The filling machine is set into operation. The meat passes through the filling pipe into the skin. Since the latter is sealed at the output end, it is gradually removed from the filling pipe. The skin brake just described ensures that this takes place uniformly.

The skin filled in this manner is supplied to the sealing machine which seals it section by section.

This can take place, for example, by the machine constricting the skin with displacers and then placing clips onto the constricted region, the clips becoming deformed when pressed onto a die and thereby forming a seal.

The invention relates especially to automated packaging machines for the production of sausages. These packaging machines operate continuously, i.e. the working steps are coordinated with one another in such a manner that individual sausages are continuously packaged to form a chain of sausages or to form individual, divided sausages.

In machines of this type, the problem regularly occurs that the moment when the skin ends has to be detected, so that the filling machine can be switched off in good time. Similarly, the filling machine has to be switched off immediately if there are what are referred to as "bursters", i.e. if the filled skin which is removed from the filling pipe unintentionally bursts. It is uneconomical to have a person continuously monitoring the machine.

There are therefore numerous proposals in the prior art for the automated monitoring of the packaging. It has therefore been proposed, for example, to fasten a crocodile clip to the end of the packaging tube, said crocodile clip flipping a switch when the end of the tube has been set in motion. A drag lever has also been thought of, on which the gathered skin rests and comes into contact with the metallic filling pipe as soon as the tube is removed. By producing the contact, an electric switching circuit is closed and produces a corresponding signal. However, with these innovations, only the reaching of the end of the tube could be detected but not, by contrast, malfunctions, such as a burst tube. However, this is made possible by a running wheel in the end region of the filling pipe, which running wheel rests on the tube material and is driven by the latter if the latter is removed correctly; if the wheel is at a standstill, which is detected by a sensor, there is either an error or the end of the tube has been reached (cf. EP 0 755 188 B1).

The previously known solutions therefore either do not detect any malfunctions or they make use of mechanical and mechanical components which involve a considerable outlay on maintenance.

The invention has the object of permitting a monitoring both of malfunctions and of the reaching of the end of the tube, the monitoring managing without mechanical components.

The invention achieves this object by means of the features of the characterizing part of patent claim 1.

In this case, a camera is any desired optical recording system for a two-dimensional image supplied by the system as an electric image signal. In this case, the term "electric" also covers the term "electronic".

An evaluation unit is a computing unit which can store images and can carry out comparison operations on them.

A switching-off unit is an electronic unit which switches off the filling machine in response to a signal from the evaluation unit.

The evaluation unit and/or the switching-off unit may either be integrated in the camera, filling machine or the like or else may be designed as one or two separate components.

The device functions, for example, with the following method which is to be carried out by the evaluation unit:

A method for the automated monitoring of packaging machines for the production of sausages, the packaging machines having
- a filling machine,
- a filling pipe,
- a skin brake, and
- a sealing machine, characterized by the following steps:
- a) An initialization value is written to an initialization memory.
- b) A region of the packaging machine is photographed with a camera.
- c) The image recorded by the camera is digitized.
- d) The digitized image is stored in an image memory.
- e) If the initialization memory contains the initialization value, the latter is overwritten with another value and a new operating cycle beginning with step b) is started.
- e') Otherwise, the image stored according to step d) is compared with an image stored previously in the operating cycle according to step d).
- f) If the comparison according to step e') reveals a difference between the images, the image memory occupied previously in the operating cycle according to step d) is released and a new operating cycle begins at step b).
- f') Otherwise, a switching-off unit is activated, so that the filling machine is switched off.

In addition to or instead of the switching off of the filling machine according to step f), a warning signal can be output and/or other functions, for example a switching off of the sealing machine, can be triggered.

A different region of the packaging machine to the one photographed by the camera according to step b) may be selected.

It is conceivable to photograph a region of the bead formed by the skin, on the filling pipe ("bead region"). The region then has to be selected in such a manner that the skin in it is constantly in motion if the removal process is functioning correctly. However, in the case of a burster, the following meat no longer exerts any pressure which could remove the skin. The skin therefore no longer moves, with the result that, in the case of the comparison according to step e'), no difference between the images is established and the cycle diverges to step f') and, consequently, the filling machine is switched off. If the end of the skin is reached, the skin disappears from the image region selected in this setting. The images following one another are identical, so that the cycle again diverges from e') to f'). Within the context of the initialization, separate steps can also be provided to photograph the blank filling pipe without the skin and to store this image as an empty image. In addition, before the switching-off unit is activated according to step f'), a comparison of the empty image with the image taken last can be carried out. If this comparison does not supply a difference, then there is no burster but rather the end of the skin is reached. This makes it possible to differentiate between a burster and the reaching of the end of the skin, and this can be taken into consideration in the triggering of the further functions.

It is also conceivable to photograph a region with a section of the skin between filling pipe and sealing machine ("balloon region"). If the machine operates correctly, then the skin inflates in this region at periodic intervals to form balloons of constant size. If two images taken consecutively are identical, there is an error, with the result that the cycle diverges from e') to f'). However, the abovementioned method can also be changed in step f) to the effect that, if there is a difference, the cycle diverges to step f') and, if consecutive images are identical, it jumps back to b). In addition, the photograph in step b) has to be coupled to the cycle of the machine, i.e. the photograph is always taken if the machine is in a certain phase, for example if the balloon is particularly inflated. This also makes it possible to establish fluctuations in the size. Fluctuations of this type are often an indication of deficient quality of the sausages produced, for example because the meat does not have the correct temperature, or the like. In this method, it is not absolutely necessary for consecutive images to be compared. It is also conceivable that, in addition or instead of this, the image photographed last is compared in each case with a desired image. The desired image can be photographed within the context of the initialization process or can be predetermined in some other manner and in each case stored.

Finally, it is also conceivable to direct the camera at the outlet region of the sealing machine where the finished sausages drop out or roll out at periodic intervals ("sausage region"). If no sausage appears here, there is an error, or the end of the skin has been reached. As is the case with photographs in the balloon region, it is also conceivable here to synchronize the photographs according to step b) with the machine cycle in order also to monitor the quality of the sausages. This is because, in the event of fluctuations in the quality, the size and/or the shape of the sausages also change. It is conceivable to measure the area of the sausage included in the image. This can take place, for example, by the photographing in color, the color of the skin being stored in the evaluation unit and this unit then determining the number of pixels which have this color and are linked together in an area. The number of pixels is then a measurement for the area. In a corresponding manner, the length (by determining the longest straight line in the area) or other shape properties can be determined and monitored. The color of the skin can be determined either in an initialization step or else continuously by a region of the skin in the region of the bead or balloon additionally being photographed. In these method variants, color tolerances can be taken into consideration and, if appropriate, light fluctuations having an effect on the color of the pixels can thus be determined.

Instead of only photographing one of the abovementioned regions, the bead, balloon and sausage regions can also be photographed in combination with one another. For this purpose, a plurality of cameras can be used. It is also conceivable to photograph two or more regions with one camera and to allow the evaluation unit only to evaluate the appropriate image excerpts. In this case, in particular the above-described, simple methods and the cyclic methods could also be combined with one another, so that the monitoring overall becomes more reliable.

The evaluation does not have to be restricted to the comparison of static images. Films can also be taken (actual films) which are continuously compared with a representative film which has either been taken during the initialization process or in an operation running correctly (desired film). It is also conceivable either to incorporate one, two or else all three regions from the bead, balloon and sausage regions into the evaluation and to operate with one or more cameras. It is likewise possible to couple the beginning of filming with the machine cycle.

Finally, it is also possible to combine film and static image evaluation with one another. Thus, it is, for example, conceivable to select the bead region in order to monitor bursters and the reaching of the end of the skin and to select one or both of the other regions in order to monitor the quality.

The transportable display unit for visualizing the image taken with the camera and having a receiving unit, and a transmission unit for transmitting the image signal to the receiving unit are advantageously additionally provided. These units can serve, when a signal is triggered, to display to the operator who is carrying the display unit with the receiving unit with him the image last photographed or the film last taken.

Two exemplary embodiments of the invention are explained in greater detail below with reference to the drawings, in which.

Figure 1:
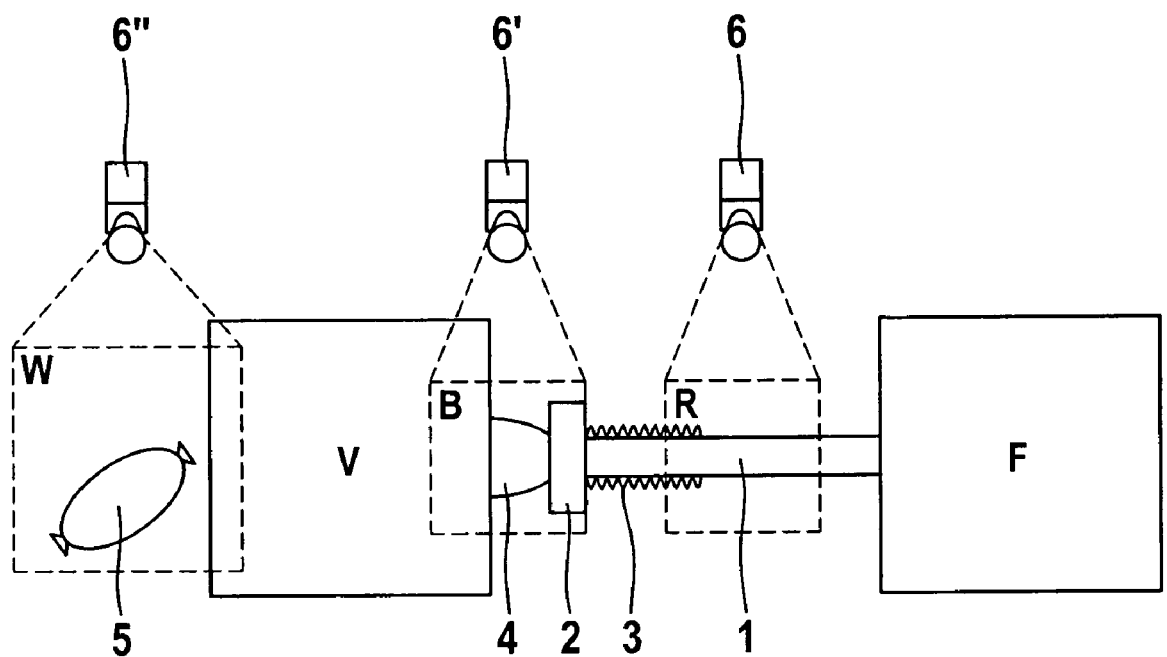
FIG. 1 shows a diagrammatic illustration of a packaging machine for the production of sausages with three cameras and in each case separate image regions.

A packaging machine comprises a filling machine F to which the one end of a filling pipe 1 is fastened. A skin brake 2 sits on the other end of the filling pipe 1. The end of a sausage skin, which is illustrated here diagrammatically as a bead 3, is situated on the section of the filling pipe 1 upstream of the skin brake. On the other side of the skin brake 2, a sealing machine V follows the filling pipe 1. The outlet region of said sealing machine is situated on its opposite side where a sausage 5 dropping out is shown. The skin forms a balloon 4 between the pipe 1 and the sealing machine V.

Figure 2:
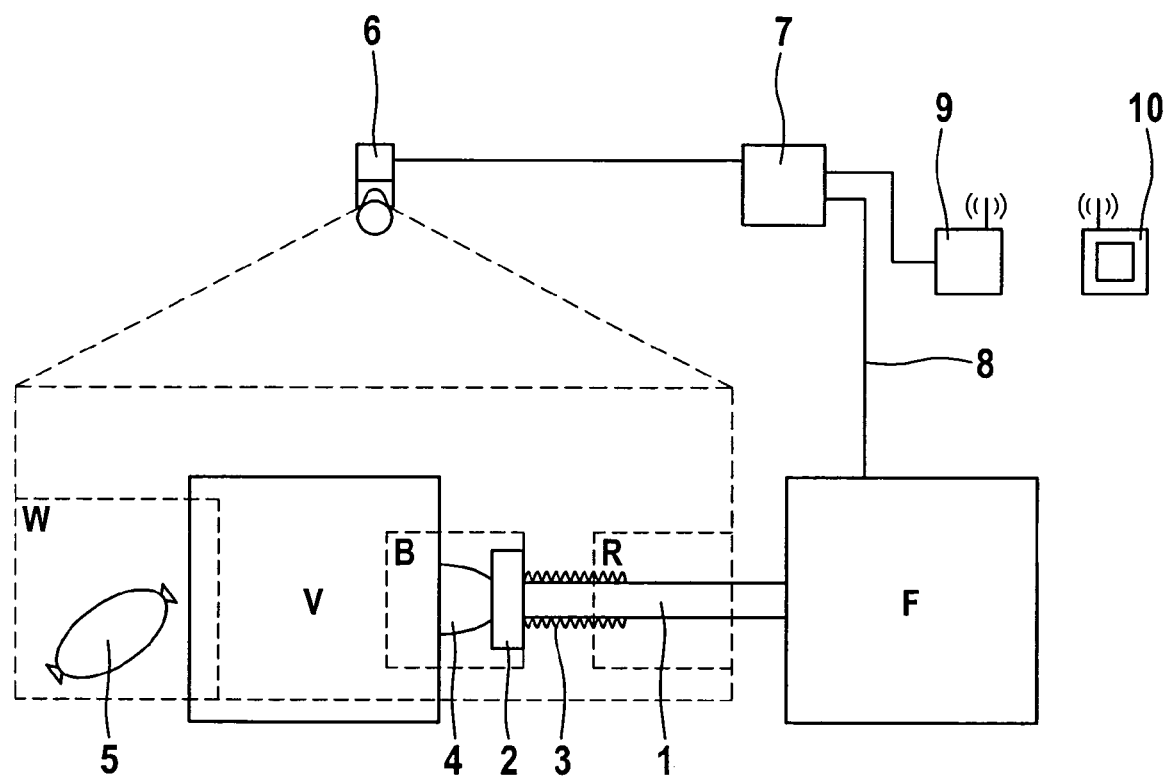
FIG. 2 shows the same illustration with just one camera with a comprehensive image range.

A respective bead region R, a balloon region B and a sausage region W are shown in each case by dashed lines. A camera 6, 6' or 6" is directed at each of the regions. As can be seen in FIG. 2, the three cameras can also be replaced by a single camera 6 which photographs a larger region covering the regions R, B and W.

As further illustrated in FIG. 2, an evaluation unit 7 is connected to the camera 6. A switching-off unit is formed from a cable 8 and interfaces (not illustrated) in the evaluation unit 7 and the filling machine F. Moreover, the evaluation unit 7 is connected via a cable to a transmission unit 9 which can transmit by radio the image photographed last or the images photographed last to the receiving unit of a transportable display unit 10.

The invention claimed is:

1. A device for the automated monitoring of packaging machines for the production of sausages, the packaging machines having a filling machine (F), a filling pipe (1), a skin brake (2) and a sealing machine (V), characterized by a camera (6, 6', 6") which supplies an electric image signal, an evaluation unit (7) for the image signal and a switching-off unit (8), which is activated by the evaluation unit, for the filling machine (F).

2. The device as claimed in patent claim 1, characterized in that a transportable display device (10) for visualizing the image taken with the camera (6, 6', 6") and having a receiving unit, and a transmission unit (9) for transmitting the image signal to the receiving unit are additionally provided.

3. A method for the automated monitoring of packaging machines for the production of sausages, the packaging machines having a filling machine (F), a filling pipe (1), a skin brake (2), and a sealing machine (V), characterized by the following steps:

a) an initialization value is written to an initialization memory;

b) a region of the packaging machine is photographed with a camera (6, 6', 6");

c) the image recorded by the camera (6, 6', 6") is digitized;

d) the digitized image is stored in an image memory; and e) if the initialization memory contains the initialization value, the latter is overwritten with another value and a new operating cycle beginning with step b) is started;

e') otherwise, the image stored according to step d) is compared with an image stored previously in the operating cycle according to step d);

f) if the comparison according to step e') reveals a difference between the images, the image memory occupied previously in the operating cycle according to step d) is released and a new operating cycle begins at step b)

f') otherwise, a switching-off unit is activated, so that the filling machine (F) is switched off.

4. The method as claimed in claim 3, characterized in that, in addition to or instead of the switching off of the filling machine (F) according to step f'), a warning signal is output and/or other functions, for example switching off the sealing machine (V), are triggered.

* * * * *